(12) United States Patent
Kim et al.

(10) Patent No.: US 11,987,867 B2
(45) Date of Patent: May 21, 2024

(54) RECYCLING METHOD FOR MANUFACTURING HIGH SPEED STEEL MASTER ALLOY FROM HIGH SPEED STEEL PROCESSING PROCESS WASTE

(71) Applicant: T&E INC., Incheon (KR)

(72) Inventors: Bae Gyun Kim, Incheon (KR); Kyeong Sik Kang, Incheon (KR)

(73) Assignee: T&E INC., Incheon (KR)

( * ) Notice: Subject to any disclaimer, the term of this patent is extended or adjusted under 35 U.S.C. 154(b) by 0 days.

(21) Appl. No.: 18/035,561

(22) PCT Filed: Jun. 3, 2021

(86) PCT No.: PCT/KR2021/006909
§ 371 (c)(1),
(2) Date: May 5, 2023

(87) PCT Pub. No.: WO2022/119063
PCT Pub. Date: Jun. 9, 2022

(65) Prior Publication Data
US 2024/0011133 A1 Jan. 11, 2024

(30) Foreign Application Priority Data
Dec. 3, 2020 (KR) .......... 10-2020-0167768

(51) Int. Cl.
*C21C 7/072* (2006.01)
*C22B 1/00* (2006.01)
*C22C 33/06* (2006.01)

(52) U.S. Cl.
CPC .......... *C22C 33/06* (2013.01); *C21C 7/072* (2013.01); *C22B 1/005* (2013.01)

(58) Field of Classification Search
CPC .......... C22C 33/06; C21B 7/072; C22B 1/005
See application file for complete search history.

(56) References Cited

U.S. PATENT DOCUMENTS 2,394,578 A * 2/1946 Wulff .......... B22F 9/04
209/11
4,705,565 A * 11/1987 Beltz .......... C22C 32/0026
419/60

FOREIGN PATENT DOCUMENTS

CN 1803339 A 7/2006
CN 1331626 C 8/2007
(Continued)

OTHER PUBLICATIONS

International Search Report for PCT/KR2021/006909 mailed on Mar. 4, 2022.
(Continued)

*Primary Examiner* — Lois L Zheng
(74) *Attorney, Agent, or Firm* — The PL Law Group, PLLC

(57) ABSTRACT

A method of recycling a waste of an HSS processing process includes a pre-treating step of pre-treating the waste of the HSS processing process, a primary melting step of forming a primary melt by primarily melting at least one of ferro molybdenum, ferro tungsten, and ferro cobalt and the pre-treated waste of the HSS processing process at 1500 to 2500 degrees Celsius (° C.), and a preparing step of preparing the HSS master alloy by ingot casting the primary melt, wherein the pre-treating step includes: a separating step of separating the waste of the HSS processing process according to a composition, and a mixing step of forming a mixture by mixing oxides containing at least one of $K_2O$, $CaO$, $MgO$, $SiO_2$, $Al_2O_3$, and $Fe_2O_3$ and the separated waste of the HSS processing process with each other, the mixture having a melting point of 800 to 1700° C.

3 Claims, 2 Drawing Sheets

(56) References Cited

FOREIGN PATENT DOCUMENTS

| | | |
|---|---|---|
| CN | 101797630 A | 8/2010 |
| CN | 102952921 A | 3/2013 |
| JP | 2002-060827 A | 2/2002 |

OTHER PUBLICATIONS

Office action issued on Mar. 15, 2022 from Korean Patent Office in a counterpart Korean Patent Application No. 10-2020-0167768 (all the cited references are listed in this IDS.) (English translation is also submitted herewith.).

Notice of Allowance issued on Jun. 2, 2022 from Korean Patent Office in a counterpart Korean Patent Application No. 10-2020-0167768 (all the cited references are listed in this IDS.) (English translation is also submitted herewith.).

* cited by examiner

FIG. 3

| SQX Calculation Result |||||||
|---|---|---|---|---|---|---|
| Sample : T&E HSS V 002(S) ||| Sample type : Metal & Alloy || Date analyzed : 2020-11-19 14:01 ||
| Application : B-U_Solid_N_797 ||||| Balance : ||
| ||||| Matching library : ||
| ||| Sample film corr. : || Impurity corr. : ||
| ||| File : 202011191401 |||||
| No. | Component | Result | Unit | Det. limit | El. line | Intensity | w/o normal |
| 1 | C | 2.7149 | mass% | 0.32492 | C -KA | 0.9691 | 9.4528 |
| 2 | O | 0.1390 | mass% | 0.96251 | O -KA | 0.0522 | 2.0813 |
| 3 | Al | 0.3786 | mass% | 0.00964 | Al-KA | 0.3891 | 0.3684 |
| 4 | Si | 0.2541 | mass% | 0.01672 | Si-KA | 0.2711 | 0.2472 |
| 5 | P | 0.0219 | mass% | 0.01612 | P -KA | 0.1435 | 0.0214 |
| 6 | Cl | 0.0134 | mass% | 0.02229 | C -KA | 0.0318 | 0.0130 |
| 7 | V | 1.7351 | mass% | 0.03103 | O -KA | 1.8597 | 1.6883 |
| 8 | Cr | 3.8366 | mass% | 0.17048 | Al-KA | 1.2652 | 3.7331 |
| 9 | Mn | 0.2973 | mass% | 0.03351 | Si-KA | 0.5532 | 0.2893 |
| 10 | Fe | 73.1148 | mass% | 0.06898 | P -KA | 160.3395 | 69.1964 |
| 11 | Co | 4.3255 | mass% | 0.04741 | C -KA | 1.0360 | 0.3167 |
| 12 | Ni | 0.1633 | mass% | 0.02574 | O -KA | 0.2675 | 0.1589 |
| 13 | Mo | 6.5039 | mass% | 0.01185 | Al-KA | 51.8578 | 4.3824 |
| 14 | W | 6.5016 | mass% | 0.07626 | Si-KA | 4.3434 | 5.3532 |

RECYCLING METHOD FOR MANUFACTURING HIGH SPEED STEEL MASTER ALLOY FROM HIGH SPEED STEEL PROCESSING PROCESS WASTE

CROSS REFERENCE TO RELATED APPLICATIONS AND CLAIM OF PRIORITY

This application claims benefit under 35 U.S.C. 119(e), 120, 121, or 365(c), and is a National Stage Entry from International Application No. PCT/KR2021/006909, filed Jun. 3, 2021, which claims priority to the benefit of Korean Patent Application No. 10-2020-0167768 filed on Dec. 3, 2020 in the Korean Intellectual Property Office the entire contents of which are incorporated herein by reference.

BACKGROUND

1. Technical Field

The present disclosure relates to a method of recycling wastes of a high speed steel processing process, and more specifically, a method of preparing a high-speed steel master alloy by recycling wastes of a high speed steel processing process.

2. Background Art

High speed steel (HSS) refers to special steel used in tools cutting metal materials at high speed and having heat resistance. The HSS is a special steel material used as a material of tools and molds, and used throughout the industry as a material of components in automobiles, ships, steel products, machines, aviation products, etc.

When the HSS is produced, wastes are generated. Wastes of the HSS process are wastes generated from a cutting process and a dimensioning and surface polishing process of an HSS material, include a mixture of cutting oil and abrasive, and include turning scrap of the cutting process and process sludge from the polishing process.

It is known that the wastes of the HSS process are generated an amount equal to or greater than 100 tons/month and 1,200 tons/year, and when considering articles other than tools, an amount of the wasters of the HSS process reaches tens to hundreds of times of 100 tons/month and 1,200 tons/year. Most of the turnings and the abrasive powders generated in an HSS processing process are landfilled or are mixed with scrap iron to become impurities in a refinery, and the process sludge from the grinding process among the wastes of the HSS process has been landfilled as general or designated wastes.

Therefore, methods capable of recycling the wastes of the HSS process have been demanded.

SUMMARY

An object of the present disclosure is to provide a method of recycling wastes of a high speed steel (HSS) processing process capable of making the wastes of the HSS processing process resources by using the wastes in a process of preparing the HSS.

The object of the present disclosure may be achieved by a method of recycling wastes of an HSS processing process, the method including: a pre-treating step of pre-treating the wastes of the HSS processing process; a primary melting step of forming a primary melt by primarily melting at least one of ferro molybdenum, ferro tungsten, and ferro cobalt and the pre-treated wastes of the HSS processing process at 1500 to 2500 degrees Celsius (° C.), and a preparing step of preparing the HSS master alloy by ingot casting the primary melt, wherein the pre-treating step includes: a separating step of separating the wastes of the HSS processing process according to a composition; and a mixing step of forming a mixture by mixing oxides containing at least one of $K_2O$, $CaO$, $MgO$, $SiO_2$, $Al_2O_3$, and $Fe_2O_3$ and the separated wastes of the HSS processing process with each other, the mixture having a melting point of 800 to 1700° C.

According to the present disclosure, it is possible to provide a method of recycling the wastes of the HSS processing process that may recycle the wastes by adding the wastes of the HSS process to a process of making the HSS.

According to the present disclosure, it is possible to provide a method of recycling the wastes of the HSS processing process that does not require separate control of impurities by recycling the wastes of the HSS process into an HSS master alloy and constantly controlling the composition of the recycled HSS master alloy

BRIEF DESCRIPTION OF THE DRAWINGS

FIG. 3 is a table illustrating a composition of an HSS master alloy prepared according to the embodiments.

DETAILED DESCRIPTION

Figure 1:
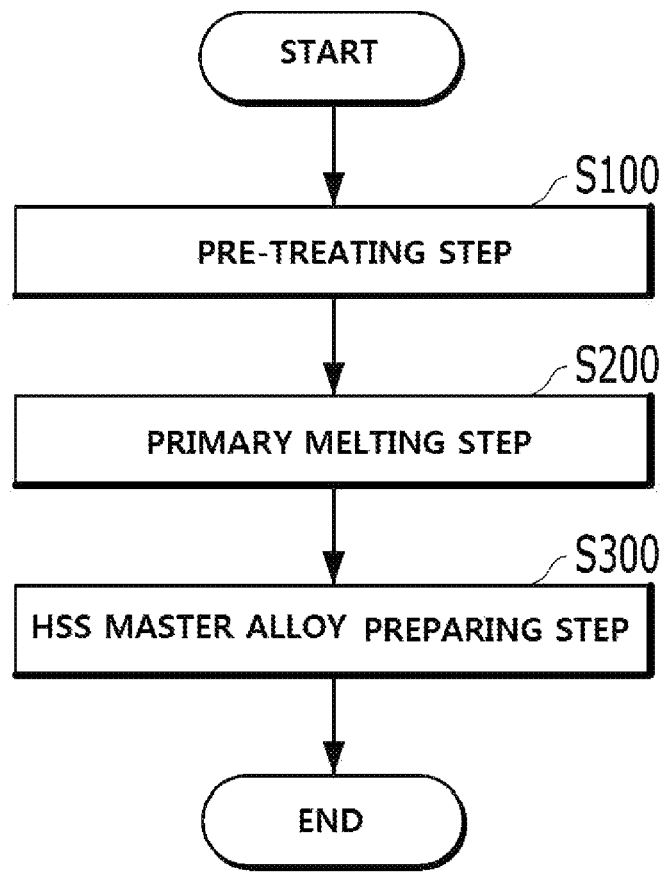
FIG. 1 is a flowchart schematically illustrating a method of recycling wastes of an HSS processing process according to an embodiment of the present disclosure.

The above objects, other objects, features, and advantages of the present disclosure will be easily understood through the following preferred embodiments related to the accompanying drawings. The present disclosure, however, is not limited to exemplary embodiments described herein and may also be embodied in other forms. On the contrary, exemplary embodiments introduced herein are provided to make disclosed contents thorough and complete and sufficiently transfer the spirit of the present disclosure to those skilled in the art.

Similar reference numerals have been used for similar components in describing each drawing. In the accompanying drawings, dimensions of the structures have been enlarged as compared with the actual dimensions for clarity of the present disclosure. The terms such as first and second may be used to describe various components, but the components are not to be interpreted to be limited to the terms. The terms are used only to distinguish one component from another component. For example, a first component may be named a second component and a second component may also be similarly named a first component, without departing from the scope of the present disclosure. Singular forms include plural forms unless the context clearly indicates otherwise.

It should be understood that terms "include" or "has" used herein specify the presence of features, numerals, steps, operations, components, parts mentioned herein, or combinations thereof, but do not preclude the presence or addition of one or more other features, numerals, steps, operations, components, parts, or combinations thereof.

It should be understood that unless otherwise specified, all numbers, values, and/or expressions expressing components, reaction conditions, and quantities of materials used herein are approximate values obtained by reflecting various uncertainties of the measurement that arise in obtaining these values among others in which these numbers are essentially different. Therefore, they should be understood as being modified by the term "about" in all cases. In addition, when numerical ranges are disclosed in this description, such ranges are continuous and include all values from a minimum value to a maximum value inclusive of the maximum value of such ranges, unless otherwise indicated. Furthermore, when such ranges refer to an integer, all integers from the minimum value to the maximum value inclusive of the maximum value are included, unless otherwise indicated.

In the present specification, when a range is described for a variable, it will be understood that the variable includes all values within the stated range including the stated endpoints of the range. For example, it may be understood that a range of "5 to 10" includes values of 5, 6, 7, 8, 9, and 10, as well as any subranges such as 6 to 10, 7 to 10, 6 to 9, 7 to 9, etc. and also any value between appropriate integers within the scope of the stated range, such as 5.5, 6.5, 7.5, 5.5 to 8.5, and 6.5 to 9, etc. In addition, for example, it may be understood that a range of "10% to 30%" includes values of 10%, 11%, 12%, 13%, etc. and all integers including up to 30%, as well as any subranges such as 10% to 15%, 12% to 18%, 20% to 30%, etc., and also any value between appropriate integers within the scope of the stated range, such as 510.5%, 15.5%, 25.5%, etc.

Unless defined otherwise, all terms (including technical and scientific terms) used in the present specification have the same meaning as meanings commonly understood by those skilled in the art to which the present invention pertains. In addition, terms defined in generally used dictionaries are not ideally or excessively interpreted unless they are specifically defined clearly.

Hereinafter, a method of recycling wastes of a high speed steel (HSS) processing process according to an embodiment of the present disclosure will be described with reference to the drawings.

Figure 2:
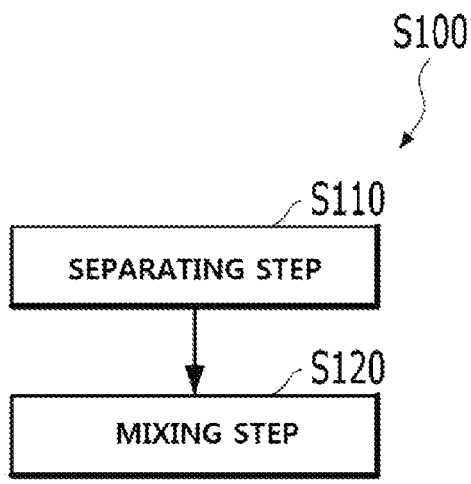
FIG. 2 is a flowchart schematically illustrating pre-treating steps included in a method of recycling wastes of an HSS processing process according to an embodiment of the present disclosure.

FIG. 1 is a flowchart schematically illustrating a method of recycling wastes of an HSS processing process according to an embodiment of the present disclosure. FIG. 2 is a flowchart schematically illustrating pre-treating steps included in a method of recycling wastes of an HSS processing process according to an embodiment of the present disclosure.

Referring to FIGS. 1 and 2, the method of recycling the wastes of the HSS processing process according to an embodiment of the present disclosure includes: a pre-treating step (S100) of pre-treating the wastes of the HSS processing process; a primary melting step (S220) of forming a primary melt by primarily melting at least one of ferro molybdenum, ferro tungsten, and ferro cobalt and the pre-treated wastes of the HSS processing process at 1500 to 2500 degrees Celsius (° C.), and a preparing step (S300) of preparing the HSS master alloy by ingot casting the primary melt.

The wastes of the HSS processing process are pretreated (S100). In the pre-treating step (S100), the wastes of the HSS processing process may include at least one of HSS process sludge, HSS turning scrap, and HSS scrap. In the present specification, "HSS process sludge" or "HSS abrasive powder" may refer to abrasive powder generated in a polishing process (size fitting process) of the HSS processing process. "HSS process sludge" may refer to HSS sludge.

In the present specification, "HSS turning scrap" may refer to scraps such as chips, shavings, metal strips, etc. generated in various cutting processes (milling, drilling, turning, etc.) during the HSS processing process.

In the present specification, "HSS scrap" may refer to HSS tools, molds, parts, and scraps generated during the HSS processing process that are discarded after being used in the process.

The composition of the HSS process sludge, HSS turning scrap, and HSS scrap may be for example, shown in Table 1 below.

TABLE 1

|    | HSS process sludge (unit: mass %) | HSS turning scrap (unit: mass %) | HSS scrap (unit: mass %) |
|----|-----------------------------------|----------------------------------|--------------------------|
| C  | 8.7840  | 10.219  | 5.1019  |
| O  | 18.7820 | 3.5754  | 1.3571  |
| Na | 1.5824  | —       | —       |
| Mg | 0.1669  | 0.0597  | 0.0539  |
| Al | 7.8546  | 0.1633  | 0.2571  |
| Si | 1.4977  | 0.2603  | 0.2888  |
| P  | 0.0095  | 0.0212  | 0.0194  |
| Cl | —       | 0.0312  | 0.0216  |
| K  | 0.0902  | —       | —       |
| Ca | 0.1506  | —       | —       |
| V  | 0.6352  | 1.6727  | 1.6504  |
| Cr | 1.4401  | 3.7970  | 4.2840  |
| Mn | 0.2896  | 0.3344  | 0.3249  |
| Fe | 54.0450 | 66.2185 | 75.7551 |
| Co | 0.4015  | 3.7732  | 0.3014  |
| Ni | 0.0891  | 0.1275  | 0.1524  |
| Cu | 0.0564  | 0.0567  | —       |
| Mo | 1.6927  | 4.1898  | 4.6808  |
| W  | 2.4324  | 5.5062  | 5.7513  |

In the pre-treating step (S100), the wastes of the HSS processing process may include, for example, 2 to 10 wt % of W, 1 to 5 wt % of Cr, 0.5 to 2 wt % of V, 1 to 10 wt % of Mo, and 1 to 10 wt % of Co. The pre-treating step (S100) may include a separating step (S110) and a mixing step (S120).

The wastes of the HSS processing process are separated according to a composition (S110). For example, the wastes of the HSS processing process may be separated according to the content of tungsten, molybdenum, cobalt, etc.

A mixture is formed by mixing oxides containing at least one of $K_2O$, $CaO$, $MgO$, $SiO_2$, $Al_2O_3$, and $Fe_2O_3$ and the separated wastes of the HSS processing process with each other (S120). In the mixing step (S120), oxides may be mixed to separate oxides contained in the wastes of the HSS processing process into slag.

The mixture may have a melting point of 800 to 1700° C. For example, a melting point of a mixture of oxides containing at least one of $K_2O$, $CaO$, $MgO$, $SiO_2$, $Al_2O_3$, and $Fe_2O_3$ and oxides contained in the wastes of the HSS processing process may be 800 to 1700° C.

In the mixing step (S120), the mixture may include $K_2O$, $Al_2O_3$, and $SiO_2$. In the mixing step (S120), a molar ratio of $K_2O:Al_2O_3:SiO$ contained in the mixture may be 1:1:2 to 1:1:6. Outside of the above range, it may be difficult to manufacture a product usable as an HSS master alloy.

The mixing step (S120) may be performed, for example, after at least one of dry specific gravity sorting and wet specific gravity sorting is performed to lower the content of oxides contained in the wastes of the HSS processing process.

The pre-treating step (S100) may further include a specific gravity sorting step. In the specific gravity sorting step, the wastes of the HSS processing process are subjected to specific gravity sorting and a material lighter than Fe among the wastes of the HSS processing process is subjected to specific gravity sorting.

The specific gravity sorting step may include a dry specific gravity sorting step and a wet specific gravity sorting step. In the dry specific gravity sorting step, moisture of the wastes of the HSS processing process may be dried at 80 to 100° C., and oil of the dried wastes of the HSS processing process may be washed with at least one of alkali and alcohol and dried the oil. For example, if the temperature is out of the above range, moisture in the wastes of the HSS processing process is not sufficiently removed, or there is no economic benefit due to excessive energy consumption during drying.

In the dry specific gravity sorting step, the dried wastes of the HSS processing process may be separated according to specific gravity through an air separation machine. Separation may be repeated several times or may be performed through several air separation machines as necessary. In the dry specific gravity sorting step, for example, the sorting by particle size may be performed by sieving to increase a sorting efficiency.

In the wet specific gravity sorting step, the wastes of the HSS processing process dried after oil washing are mixed with water, and the specific gravity sorting may be performed on a shaking table. In the wet specific gravity sorting step, the wastes of the HSS processing process may be separated by repeating several times or installing several stages of shaking tables as needed. After the sorting, it may be dried to a moisture content of 10% or less based on the total weight. In the wet specific gravity sorting step, for example, the sorting by particle size may be performed by sieving to increase the sorting efficiency.

At least one of the ferro molybdenum, the ferro tungsten, and the ferro cobalt and the pretreated wastes of the HSS processing process are primarily melted at 1500 to 2500° C. to form a primary melt (S200). If the temperature is less than the above range, melting may not be sufficient. If the temperature exceeds the above range, melting becomes excessive, making it difficult to manufacture products that may be used as the HSS master alloy, and there is no economic benefit, such as the need to manufacture a special crucible that may withstand high temperatures.

The primary melting step (S200) may be performed, for example, for 1 to 8 hours in a melting furnace. If the time is less than the above range, melting may not be sufficient. If the time exceeds the above range, melting becomes excessive, and it may be difficult to manufacture a usable product from the HSS master alloy.

In the primary melting step (S200), melting may be performed in a vacuum atmosphere or an inert gas atmosphere.

In the primary melting step (S200), at least one of the ferro molybdenum, the ferro tungsten, and the ferro cobalt may be added in order to obtain a desired composition of the HSS master alloy.

In the primary melting step (S200), high-pressure oxygen may be blown into the melt in order to degas and lower the carbon content.

In the primary melting step (S200), at least one of an oxide, a deoxidizer, and a flux added when forming a slag composition or a mixture may be further added.

In the primary melting step (S200), at least one of HSS turning scrap, HSS scrap, and HSS process sludge may be further added.

In the primary melting step (S200), when the ferro molybdenum is added, a weight of the ferro molybdenum may be 0.1 to 10% based on the weight of the pretreated wastes of the HSS processing process. In the primary melting step (S200), when the ferro tungsten is added, a weight of the ferro tungsten may be 0.1 to 10% based on the weight of the pretreated wastes of the HSS processing process. In the primary melting step (S200), when the ferro cobalt is added, a weight of the ferro cobalt may be 0.1 to 10% based on the weight of the pretreated wastes of the HSS processing process.

In the primary melting step (S200), 1 to 2 wt % of the ferro tungsten, 4 to 5 wt % of the ferro molybdenum, and 0.5 to 1 wt % of the ferro cobalt may be added based on the weight of the pretreated wastes of the HSS processing process. A recyclable HSS master alloy may be prepared by adding the ferro tungsten, the ferro molybdenum, and the ferro cobalt within the above ranges.

In an embodiment, in the method of recycling the wastes of the HSS processing process according to an embodiment of the present disclosure, when the wastes of the HSS processing process include HSS process sludge, HSS turning scrap, and HSS scrap, the oxides and HSS process sludge may be mixed in the mixing step (S120). Here, the oxides may include at least one of $K_2O$, CaO, MgO, $SiO_2$, $Al_2O_3$, and $Fe_2O_3$. In the mixing step (S120), HSS turning scrap and HSS scrap may not be mixed. In the primary melting step (S200), a portion of the HSS scrap, a portion of the mixture, a portion of the HSS turning scrap, a remaining amount of the mixture, a remaining amount of the HSS turning scrap, and a remaining amount of the HSS scrap may be sequentially charged into the melting furnace. The melting furnace is melted in a temperature range of 1,500 to 1,700° C., and after a certain time has elapsed, the ferro molybdenum, the ferro tungsten, and the ferro cobalt may be added thereto to maintain the above temperature range for a certain time.

An HSS master alloy is prepared by ingot casting the primary melt (S300). For example, ingot casting is performed by press molding the primary melt.

The HSS master alloy prepared in the preparing step (S300) may have a composition of one of (1) 5 to 10 wt % of W, 3 to 6 wt % of Cr, 1 to 6 wt % of V, and 6 to 11 wt % of Mo; (2) 5 to 10 wt % of W, 3 to 6 wt % of Cr, 1 to 6 wt % of V, 6 to 11 wt % of Mo, and 4 to 12 wt % of Co; (3) 5 to 12 wt % of Mo, 3 to 6 wt % of Cr, 1 to 6 wt % of V, and 6 to 11 wt % of W; and (4) 5 to 12 wt % of Mo, 3 to 6 wt % of Cr, 1 to 6 wt % of V, 6 to 11 wt % of W, and 4 to 12 wt % of Co. In the compositions (1) to (4) above, the other compositions may include at least one of Fe, C, O, Al, Si, P, Cl, Mn, and Ni.

The method of recycling the wastes of the HSS processing process according to an embodiment of the present disclosure has a composition within the above range, and it is possible to manufacture a product that may be used as the HSS master alloy.

The method of recycling the wastes of the HSS processing process according to an embodiment of the present disclosure may further include an initial impurity removing step of removing initial impurities based on a particle size through sieving by making the wastes of the HSS processing process into a powder form.

The method of recycling the wastes of the HSS processing process according to an embodiment of the present disclosure may further include a purifying step of moving the primary melt to a holding furnace and degassing the primary melt and purifying impurities of the primary melt. The purifying step may be performed, for example, via at least one of thermal decomposition and electrolysis.

The method of recycling the wastes of the HSS processing process according to an embodiment of the present disclosure may further include a secondary melting step of forming a secondary melt by secondarily melting of at least one of the ferro molybdenum, the ferro tungsten, the ferro cobalt, ferro chromium and the ferro vanadium, and the ingot-cast melt at 1000 to 1300° C. If the temperature is less than the above range, melting may not be sufficient, and if the temperature exceeds the above range, there is no economic benefit due to excessive energy consumption.

The secondary melting step may be performed in a vacuum atmosphere or inert gas atmosphere.

The secondary melting step may be performed, for example, for 1 to 8 hours in a melting furnace. If the temperature is less than the above range, melting may not be sufficient, and if the temperature exceeds the above range, there is no economic benefit due to excessive energy consumption.

In the secondary melting step, at least one of the ferro molybdenum, the ferro tungsten, the ferro cobalt, the ferro chromium, and the ferro vanadium may be added in order to obtain a desired composition of the HSS master alloy.

In the secondary melting step, high-pressure oxygen may be blown into the melt in order to degas and lower the carbon content.

In the secondary melting step, at least one of an oxide, a deoxidizer, and a flux added when forming a slag composition or a mixture may be further added.

In the secondary melting step, at least one of HSS turning scrap, HSS scrap, and HSS process sludge may be further added.

The method of recycling the wastes of the HSS processing process according to an embodiment of the present disclosure may further include a purifying step of moving the secondary melt to a holding furnace and degassing the secondary melt and purifying impurities of the secondary melt. The purifying step may be performed, for example, via at least one of thermal decomposition and electrolysis.

Hereinafter, the present disclosure will be described in more detail through specific Examples. The following Examples are only examples to assist the understanding of the present disclosure, and the scope of the present disclosure is not limited thereto.

Examples

As the wastes of the HSS processing process, 1 kg of HSS scrap, 1 kg of HSS turning scrap, and 2 kg of HSS process sludge were prepared. The composition of each of HSS scrap, HSS turning scrap, and HSS process sludge may be the same as those shown in Table 1 above.

The molar ratio of $K_2O:Al_2O_3:SiO_2$ in the mixture obtained by mixing 2 kg of HSS sludge, 202.5 g of $K_2O$, and 441.7 g of $SiO_2$ was set to 1:1:4.

As a melting furnace, a graphite crucible (1.5 L), which is a high-frequency melting furnace in an atmospheric atmosphere, was used. The HSS scrap (0.5 kg), the mixture (1.322 kg), the HSS turning scrap (0.5 kg), the mixture (1.322 kg), the HSS turning scrap (0.5 kg), and the HSS scrap (0.5 kg) were sequentially charged into the graphite crucible. After 10 minutes elapsed after the temperature was raised to 1700° C. (heating time 30 minutes), 35 g of the ferro tungsten, 95 g of the ferro molybdenum, and 16 g of the ferro cobalt were added thereto and maintained for 20 minutes. After it was poured into a prepared mold and cooled, the slag was broken and brushed off, and 2.85 kg of the HSS master alloy product was manufactured.

A composition ratio of the manufactured HSS master alloy product is shown in FIG. 3. Referring to FIG. 3, it could be confirmed that 2.85 kg of a product having physical properties usable as an HSS master alloy was obtained by using 4 kg of wastes of the HSS processing process.

As described above, although exemplary embodiments of the present disclosure has been described with reference to the accompanying drawings, those skilled in the art to which the present invention pertains will be able to understand that the present disclosure may be implemented in other specific forms without changing the technical spirit or essential features. Therefore, it is to be understood that exemplary embodiments described herein above are illustrative rather than being restrictive in all aspects.

What is claimed is:

1. A recycling method of preparing a high speed steel (HSS) master alloy from wastes of HSS processing process, comprising:
   a pre-treating step of pre-treating the wastes of the HSS processing process;
   a primary melting step of forming a primary melt by primarily melting the pre-treated wastes of the HSS processing process at 1500 to 1700 degrees Celsius (° C.) in a melting furnace;
   a purifying step of moving the primary melt to a holding furnace and degassing the primary melt and purifying impurities of the primary melt;
   a preparing step of preparing the HSS master alloy by ingot casting the primary melt purified in the purifying step; and
   wherein the pre-treating step includes:
   a separating step of separating the wastes of the HSS processing process having a HSS process sludge, a HSS turning scrap, and a HSS scrap; and
   a mixing step of forming a mixture by mixing oxides containing $K_2O$, $Al_2O_3$, and $SiO_2$ and the separated wastes of the HSS processing process with each other, the mixture having a melting point of 800 to 1700° C.,
   wherein a molar ratio of $K_2O:Al_2O_3:SiO_2$ contained in the mixture is 1:1:2 to 1:1:6,
   wherein the primary melting step of being performed in a vacuum atmosphere or an inert gas atmosphere during 1 hour to 8 hours,
   the primary melting step of being performed by sequentially charging a portion of the HSS scrap, a portion of the mixture, a portion of the HSS turning scrap, a remaining amount of the mixture, a remaining amount of the HSS turning scrap, and a remaining amount of the HSS scrap into the melting furnace, and then the melting furnace keeping a temperature by adding 1 to 2 wt % of the ferro tungsten, 4 to 5 wt % of the ferro molybdenum, and 0.5 to 1 wt % of the ferro cobalt based on the weight of the pretreated wastes of the HSS processing process,
   wherein the pre-treating wastes of the HSS processing process including 2 to 10 wt % of W, 1 to 5 wt % of Cr, 0.5 to 2 wt % of V, 1 to 10 wt % of Mo, and 1 to 10 wt % of Co,
   a secondary melting step further comprising a secondary melt by secondarily melting of at least one of the ferro molybdenum, the ferro tungsten, the ferro cobalt, the ferro chromium, and the ferro vanadium, and the ingot-cast melt at 1000 to 1300° C., and the recycling method is made to selectively manufacture the HSS master alloy containing compositions of any one or more of Mo, W, Co, Cr, and V.

2. The recycling method of claim 1, wherein the HSS master alloy prepared in the preparing step comprises a composition of one of (1) 5 to 10 wt % of W, 3 to 6 wt % of Cr, 1 to 6 wt % of V, and 6 to 11 wt % of Mo; (2) 5 to 10 wt % of W, 3 to 6 wt % of Cr, 1 to 6 wt % of V, 6 to 11 wt % of Mo, and 4 to 12 wt % of Co; (3) 5 to 12 wt % of Mo, 3 to 6 wt % of Cr, 1 to 6 wt % of V, and 6 to 11 wt % of W; and (4) 5 to 12 wt % of Mo, 3 to 6 wt % of Cr, 1 to 6 wt % of V, 6 to 11 wt % of W, and 4 to 12 wt % of Co, and the method further comprises at least one of Fe, C, O, Al, Si, P, Cl, Mn, and Ni.

3. The recycling method of claim 1, wherein, in the pre-treating step, a specific gravity sorting step further comprises sorting specific gravities of the wastes of the HSS processing process and separating a material lighter than Fe among the wastes of the HSS processing process, and wherein the specific gravity sorting step includes:
a dry specific gravity sorting step of drying moisture of the wastes of the HSS processing process at 80 to 100° C. and cleaning oil of the dried wastes of the HSS processing process with at least one of alkali and alcohol and then drying the oil; and
a wet specific gravity sorting step of mixing the wastes of the HSS processing process dried after cleaning the oil with water and sorting specific gravities on a shaking table.

* * * * *